(12) United States Patent
Mendoza

(10) Patent No.: US 9,141,973 B2
(45) Date of Patent: Sep. 22, 2015

(54) SYSTEM AND METHOD FOR LICENSE PLATE FRAME ADVERTISING VERIFICATION AND VALIDATION

(71) Applicant: Sergio Mendoza, Key Biscayne, FL (US)

(72) Inventor: Sergio Mendoza, Key Biscayne, FL (US)

(73) Assignee: SERGIO MENDOZA, Key Biscayne, FL (US)

( * ) Notice: Subject to any disclaimer, the term of this patent is extended or adjusted under 35 U.S.C. 154(b) by 237 days.

(21) Appl. No.: 13/655,331

(22) Filed: Oct. 18, 2012

(65) Prior Publication Data

US 2014/0114764 A1    Apr. 24, 2014

(51) Int. Cl.
G06Q 30/00    (2012.01)
G06Q 30/02    (2012.01)
G09F 21/04    (2006.01)
G09F 7/18     (2006.01)

(52) U.S. Cl.
CPC .......... G06Q 30/0265 (2013.01); G09F 21/048 (2013.01); G09F 2007/1895 (2013.01)

(58) Field of Classification Search
USPC .......... 705/7.2–7.37, 14.1–14.78, 27.1–27.7; 706/1–47; 340/413–973; 235/114.1–473.5; 361/670–681; 40/207–209
See application file for complete search history.

(56) References Cited

U.S. PATENT DOCUMENTS

| | | | |
|---|---|---|---|
| 4,445,291 A | 5/1984 | Easley | |
| 7,535,343 B1 | 5/2009 | Pinckney | |
| 8,139,290 B2 | 3/2012 | Choi | |
| 2002/0174012 A1* | 11/2002 | Litwin | 705/14 |
| 2006/0208087 A1* | 9/2006 | Kressin et al. | 235/472.02 |
| 2008/0162154 A1 | 7/2008 | Fein et al. | |
| 2009/0164319 A1* | 6/2009 | Kole et al. | 705/14 |
| 2010/0179878 A1* | 7/2010 | Dawson et al. | 705/14.62 |
| 2010/0036739 A2 | 12/2010 | Barlow et al. | |
| 2011/0106372 A1* | 5/2011 | Walwer | 701/33 |
| 2013/0013412 A1* | 1/2013 | Altman et al. | 705/14.61 |
| 2013/0238441 A1* | 9/2013 | Panelli | 705/14.62 |
| 2013/0246181 A1* | 9/2013 | Lobsenz | 705/14.63 |

* cited by examiner

*Primary Examiner* — Thomas M Hammond, III
*Assistant Examiner* — Errol Carvalho
(74) *Attorney, Agent, or Firm* — Maxvalueip LLC

(57) ABSTRACT

Advertisement is a multi-billion dollar business in US (per year). Here, we use license plate frames for the advertisement. One example of the application describes a license-plate-frame-based advertisement verification system. In order to validate and verify the correct placement/mounting of a license plate frame advertisement at a given location over time, it is necessary to validate that both (a) the ad is correctly placed on the vehicle, and (b) to verify that the ad is at a given location at that time. The method required to verify these includes some control systems and components. Different variations and examples are also presented here.

9 Claims, 8 Drawing Sheets ad assembled

SYSTEM AND METHOD FOR LICENSE PLATE FRAME ADVERTISING VERIFICATION AND VALIDATION

BACKGROUND OF THE INVENTION

People and businesses try to advertise on new media, or try to explore/use new/innovative methods, to find new channels to reach consumers and potential buyers, or try to do those tasks more efficiently and/or with less cost.

One advertising method is on automobiles. Automobiles are mobile, and thus, they can carry the information about a product or advertisement to different parts of a city or a country, presenting a large audience for the ad or product (or service or brand). Advertisements can be attached to an automobile through the license plate feature, but to be able to sell license plate frame based advertising, it is preferred that one can validate and verify the correct placement/mounting of a license plate frame advertisement at a given location over time. This is useful because the license plate fixture is one of the only few standardized aspects of vehicles that can be used to mount advertisements. However, without verification of the ad placement, it is difficult to sell advertisements on third-party vehicles based on time and location.

Some of the related art are listed below:
U.S. 20100036739, Mobile Billboard Advertising System and Apparatus
U.S. Pat. No. 4,445,291, License Plate Frame with Detachable Display Panels
20080162154, System and Method for Vehicle Advertising Network In this disclosure, we present a system and method for validation of correct ad placement on a license plate frame and verification of ad location over time.

SUMMARY OF THE INVENTION

One embodiment of the invention describes a license-plate-frame-based advertisement verification system. In order to validate and verify the correct placement/mounting of a license plate frame advertisement at a given location over time, it is necessary to validate that both (a) the ad is correctly placed on the vehicle, and (b) to verify that the ad is at a given location at that time. The method required to verify these comprises some control systems and components, which will be described below.

BRIEF DESCRIPTION OF THE DRAWINGS

Some examples and embodiments are described here for clarification, but the inventions are not limited to these examples.

DETAILED DESCRIPTION OF THE PREFERRED EMBODIMENTS

Figure 1:
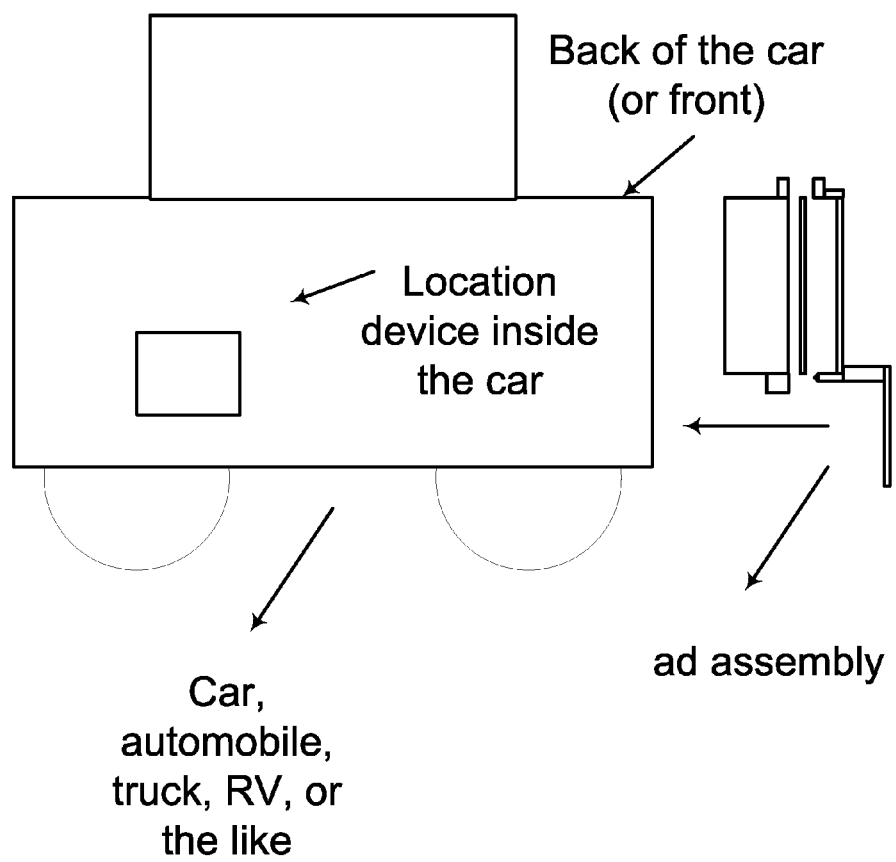
FIG. 1 shows a typical system assembled on a car according to an embodiment of the invention.

Here, we present a system/method to validate and verify license plate frame ad placement at a given location. Identity must be verified for the following items:

Publisher Identity—The identity of the owner of the vehicle(s), because a single person can have many vehicles Mount Identity—The identity of the specific hardware mount installed on a specific vehicle Ad Identity—The identity of a physical ad that can be attached to a mount And in addition to the above identities being verified over time, the following details must be logged:

Mount Log—Log when mount is correctly installed on the car. This log is needed in order to verify that the mount has been installed correctly and has not been removed from the vehicle.

Ad Log—Log when ad is correctly attached to the mount. Since ad can be removable, this log is needed to verify that it is attached/connected to the mount correctly.

Proximity Log—Log when ad is near the location logging device. Since the device is not necessarily physically joined to the ad, this log is needed to determine when the ad is approximately in the same location as the location device (in proximity).

Location Log—Log location of the location logging device. This keeps track of the position of the location device over time.

When the information contained in these four logs is correlated, it is possible to validate and verify the license plate frame ad placement at a given location over time, at any given time. Basically, it shows that if the ad is correctly placed on the automobile, and the location of ad is tracked, then the advertisement can be sold based on time and location. If the location is verified and certified, then the ad payment can be done to the people involved. More than one person or entity can be involved in this chain of transaction, for ad payments, for which each gets a percentage of the deal or payment.

Now, referring to the figures, let's assume that a person willing to advertise on a vehicle (a publisher) receives a license plate frame mount (the mount) that can be installed on his/her vehicle. It is installed on the vehicle, and the time during which the mount is correctly attached to the vehicle is logged, as the mount log, and that includes the mount ID.

The publisher receives an advertisement to be attached to the license plate frame mount, the ad. The advertisement is attached to the license plate frame mount, and the time during which the ad is correctly attached to the license plate frame mount is logged, as the ad log, and that includes the mount ID and ad ID.

Simultaneously, a location device logs (1) its location over time, the location log, and (2) the time during which the ad is in proximity of the location device, the proximity log, and that includes the ad ID. The location device communicates with the ad and mount, and it requests and receives the ad and mount logs.

In one embodiment, the location device (in one embodiment, also, the transmitter) sends the location log, the proximity log, the mount log, and the ad log to a centralized database, server, location, or computer. The four logs are combined to validate and verify placement and location of ad over time, to be able to charge for advertising.

Other Embodiments

In the above examples, the location device and the transmitter are combined, and the advertisement and mount are separated physically, but the Mount, Advertisement, Location Device, and Transmitter (for communication to centralized database) can either be separate devices/modules or be combined physically. The variations of the system include all permutations of physical combinations, for separated modules or combined modules, in terms of locations, positions, and integration.

Non-Aggregate Transmission

The logs do not need to be sent to a centralized database together. Instead, they can be sent individually, in another embodiment. The transmission of data can be on push or pull basis. They can be sent in any form of transmission or storage. The data can be in any format. The data can be transmitted periodically or based on some events or requests.

Location Device & Transmitter Separated Physically

In the above example, the location device and the transmitter are the same device. If they were separate, the transmitter would need to receive all logs to send them to a centralized database. So, in another embodiment, the location device and the transmitter are separate, and there is a connection between them, to carry the data from one to the other, using cable, fiber optics, antenna, wireless, optical, copper, or wire.

Mount & Advertisement Combined Physically

This combination would make the ad log redundant. The proximity log and location log would still be required.

Advertisement & Location Device Combined Physically

This combination would make the proximity log redundant. The ad log, mount log, and location log would still be required.

Mount & Location Device Combined Physically

All logs would still be required.

Advertisement & Mount & Location Device Combined Physically

This combination would make the ad log and proximity log redundant. The mount log and location log would still be required.

Figure 2A:
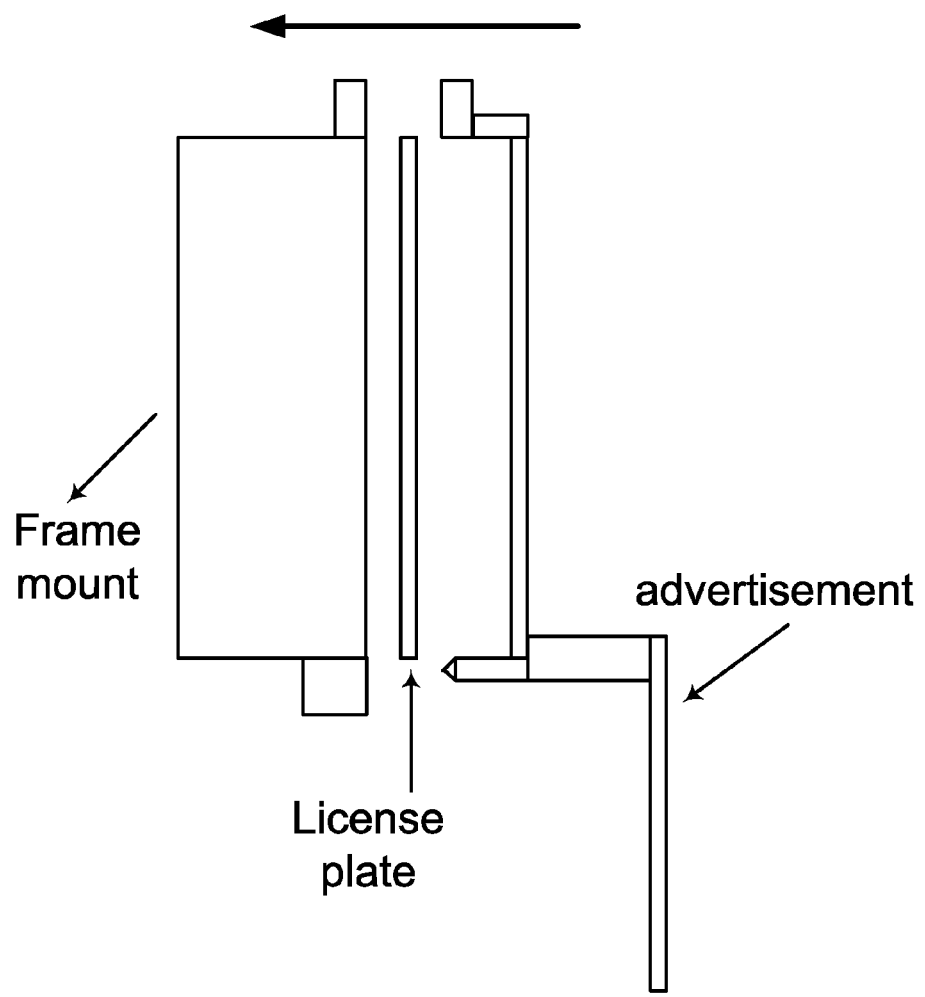
FIG. 2 a, b, and c show typical components assembled together according to an embodiment of the invention, the license plate attached to the frame mount with screws, and how it is assembled together, respectively.
Figure 2:
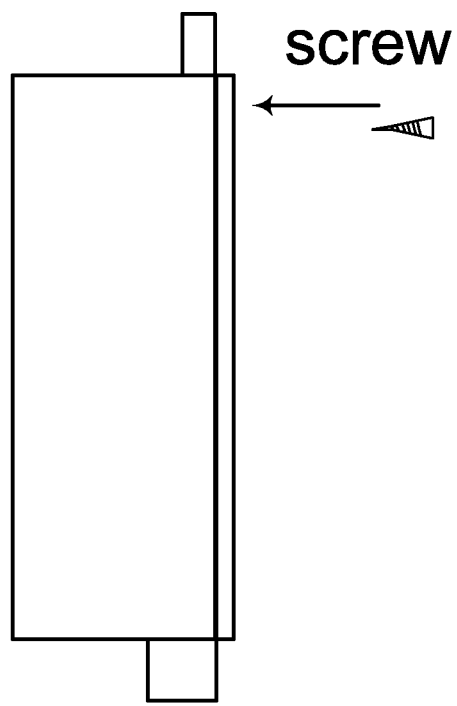
Figure 2:
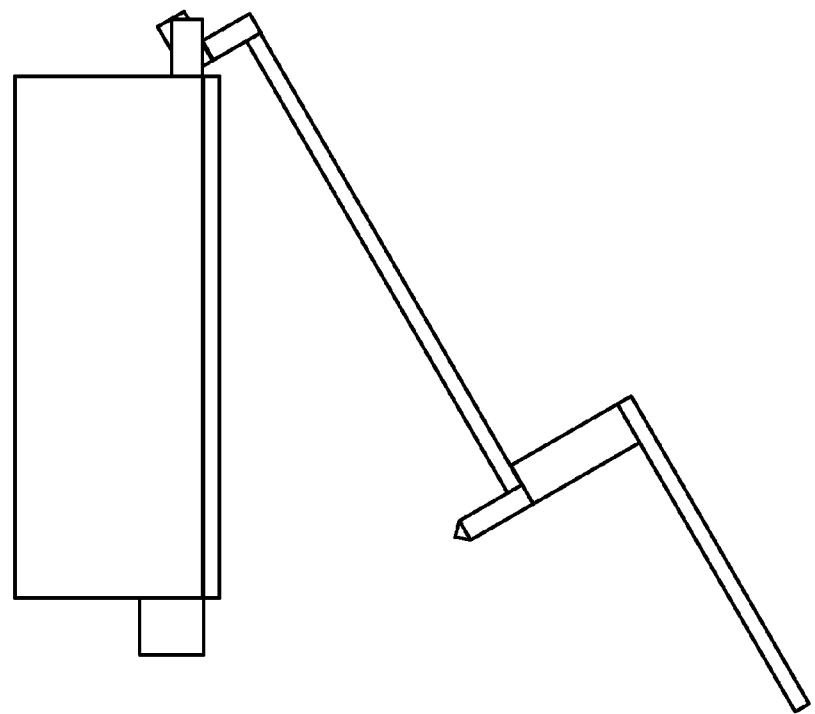
Figure 3:
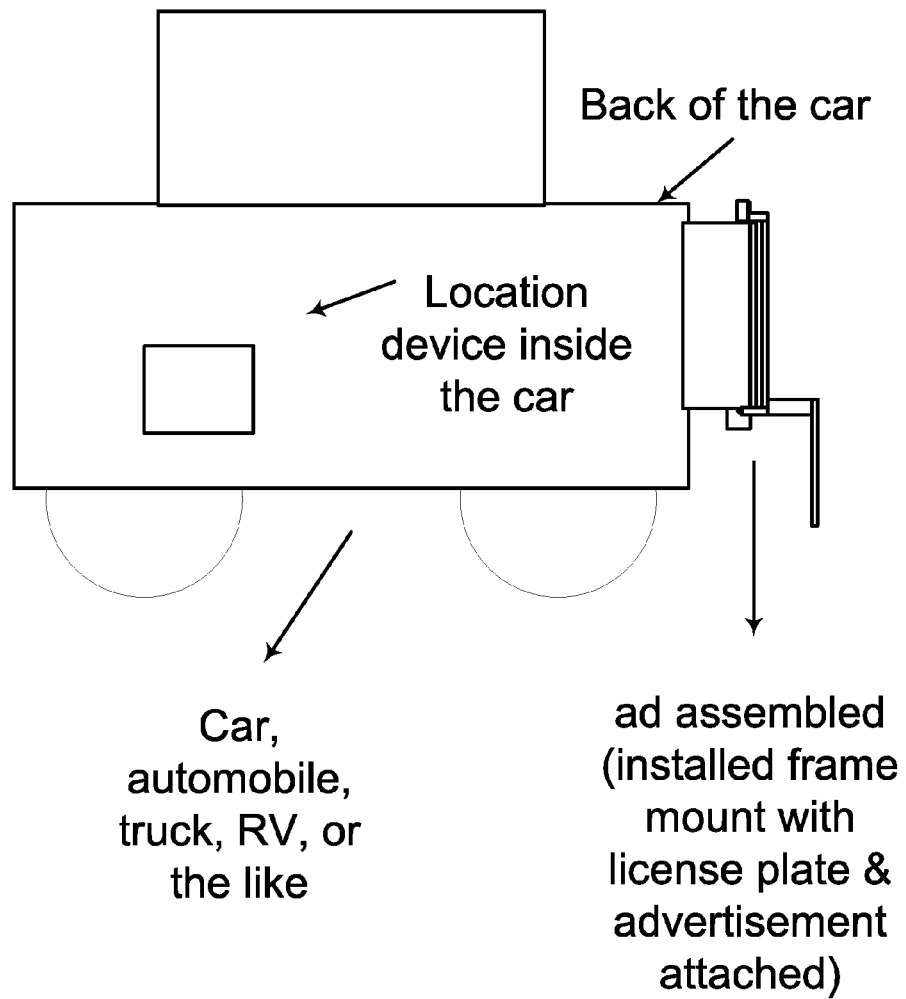
FIG. 3 shows a typical system assembled on a car according to an embodiment of the invention.
Figure 4:
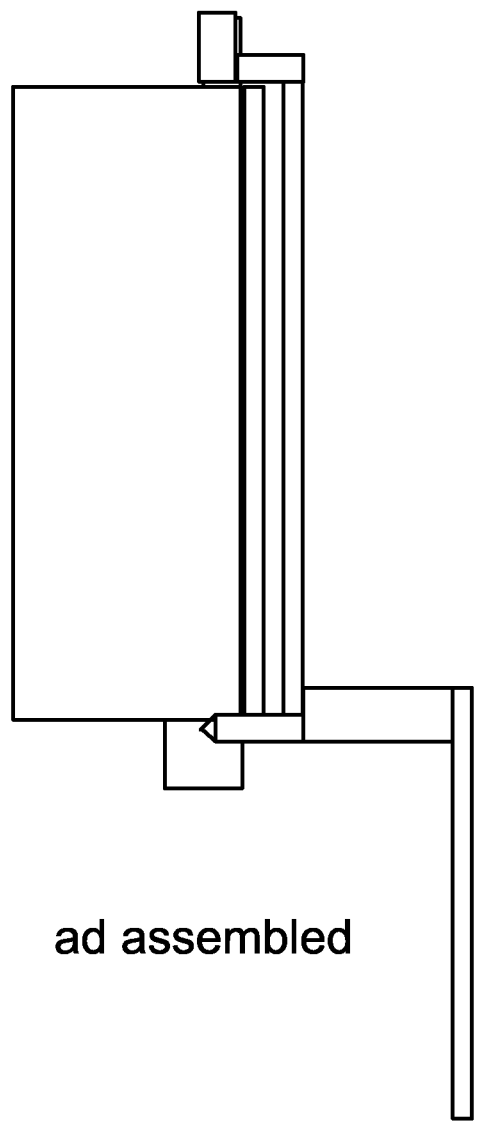
FIG. 4 shows typical components as assembled according to an embodiment of the invention.
Figure 5:
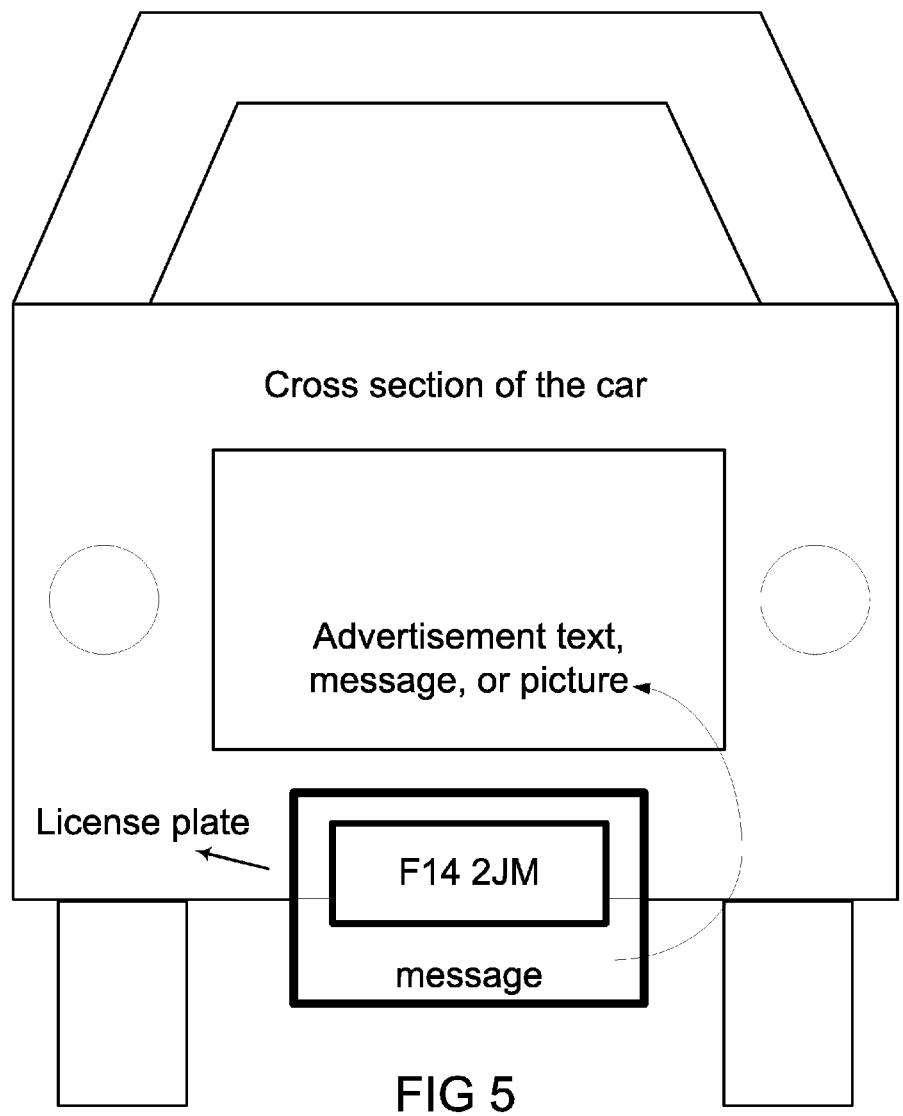
FIG. 5 shows a typical ad displayed according to an embodiment of the invention.
Figure 6:
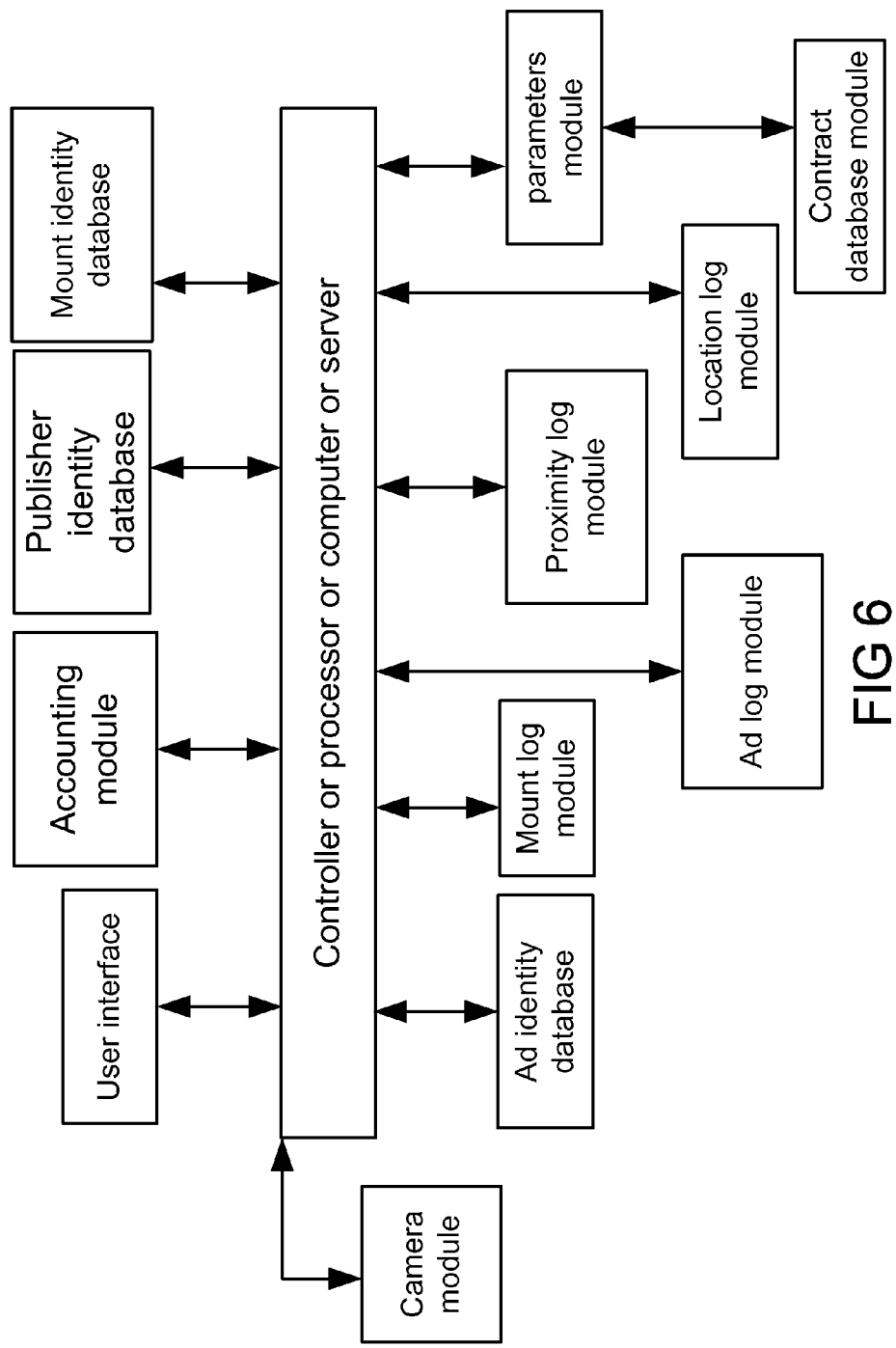
FIG. 6 shows a typical system according to an embodiment of the invention.

FIG. 2 shows how the components are arranged together, and FIG. 4 shows how they are put together at the end. (FIG. 2 a, b, and c show typical components assembled together according to an embodiment of the invention, the license plate attached to the frame mount with screws, and how it is assembled together, respectively.) FIG. 1 shows how they are connected to a car, and FIG. 3 shows how they are assembled on a car. FIG. 5 shows the final result from the back side of the car. FIG. 6 shows the component of a typical system, operating the method of the invention, in one embodiment.

The system of FIG. 6 shows the system (example) with the identity databases, log modules, accounting module for payment processing, user interface for inputting parameters, camera module for inspection of the ad (visually), and parameter module feeding parameters from contracts into the central processor or controller unit. The messages between different modules carry information about time for ads and total time period, plus verification of locations and positions, with proper payment accounting and messages related to authorization to pay, based on people involved and percentages, based on the prior contract or agreement(s), held as a collection of parameters in a database or central location.

The ads can be fixed, dynamic, printed, electronic, or digital message, form, text, or figure/image/photo/multimedia, on a display, LCD, monitor, metal, engraved, printed, painted, plastic, cardboard, wood, elastic material, natural material, artificial material, or any other substrate or board or frame or holder.

The accounting module is connected to billing module, which sends notices on paper or electronically, about the balances on the accounts to various parties and account holders, including car owner, ad owner, ad sponsor, and middleman/salesman, who gets a percentage or bonus for each transaction.

This plate can be in front or back (or side) of the car, as different variations/examples of the invention. In one example, we have an advertisement attached to a car or vehicle, such as bus or truck or bike, with or without motor or engine, with a method of verification, using a system, as described here.

The proximity can be measured or verified using a magnetic device or magnets or detector, or RFID, active or passive, or tag or beacon, with sound or optical signals, or using electromagnetic radiation at various frequencies, visible or not-visible spectrum, or antennas, or GPS system, as well as triangulation technique or satellite signal.

The positions can be locked and sealed using verifiable seals or locks, which can be visually or electronically verified for its integrity, to make sure nobody tampered with it or broke it. Electronic seals can be a closed circuit with a battery, in which if the seal is broken, the circuit is broken as well, producing different voltage, current, or resistivity, signaling the tampering event on the seal, for the warning or knowledge of the administrator or owner of the system, to keep track of the usages and payments with proper time periods and rates/totals, for proper and fair accountings. The visual verification can be done, using a person, or automatically, using a camera, with a pattern recognition module, to verify the image or picture taken from the scene.

The payments can be gradual or micro-payments, or aggregated per month or weekly, for lump-sum payments, or installments, from a central accounting office, keeping the time periods for all ads, and accounting for all accounts and usages, for proper and fair payments for all people involved in this transaction. Sometimes, it is more efficient to aggregate the payments per month or based on the contract period, as specified in the agreements between the parties involved. These parameters can be input into the system in a template or database, for updates or initiation of the system at the beginning. There is a user-interface or GUI, per user or for admin for the whole system, as central location or locally, or remotely, or on spot, as different embodiments of the invention, for controlling or inputting the data or parameters.

The IDs can be related to a number, code, symbol, or encrypted text, for matching or verification purposes. The PKI, keys, or biometrics can be used for security purposes.

The warning module can warn the central location or server or the admin about the breach or tampering event, as the separate log for tampering events or breaches or attempts for the breach. The warning can be an electronic message or texting, or any electrical signal or flag, or optical means, transmitted to the user, owner, or admin. The central location or server can penalize or discontinue the agreement with the specific car owner, in case of a breach or attempt of breach, or alternatively, the admin can subtract a portion of the payments for the time not in service, or not verified, based on a table or schedule or curve, predetermined or based on a prior agreement between the parties.

The connections or communications between components, databases, sub-systems, storages, memory units, buffers, and registries are done wirelessly, optically, cable, wired, or by antenna.

In one example, the GPS is the device for finding the location of the object or device.

Any variations of the above teachings are also intended to be covered by this patent application.

The invention claimed is:

1. A system for license plate frame advertising verification and validation, for a vehicle, said system comprising:
   a frame mount, wherein the frame mount is attached to the vehicle and holds a license plate;
   a physical advertisement affixed to the frame mount;
   a camera, affixed to the frame mount, configured to visually inspect the physical advertisement affixed to the frame mount;
   a plurality of identities stored in the at least one database, wherein the plurality of identities comprise;
      a frame mount identity;
      a publisher identity; and
      an ad identity;
   a location device, comprising a transmitter, wherein the location device is configured to electronically receive and transmit a plurality of electronic logs, the frame mount identity, the publisher identity, and the ad identity, to a remote electronic memory, further wherein the location device is inside or attached to the vehicle, and further wherein the plurality of electronic logs are stored in at least one database, wherein the plurality of electronic logs comprise:
      a location log, wherein the location log is configured to register a log entry for all locations of the location device, to keep track of the position of the location device over time;
      a proximity log, wherein said proximity log is configured to register a log entry when the physical advertisement is within a predetermined proximity of the location device, for verification of location of the physical advertisement;
      a frame mount log, wherein the frame mount log is configured to register a log entry when the frame mount is correctly installed on said vehicle, to verify proper installation on said vehicle; and
      an ad log, wherein the ad log is configured to register a log entry when the physical advertisement is correctly affixed to the frame mount, to verify proper installation; and
   a computer processor configured to:
   verify the mount identity, the publisher identity, and the ad identity; and
   validate a payment to be made to the publisher, at any time, by correlating the location log, the proximity log, the frame mount log, and the ad log, together with the frame mount identity, the publisher identity, and the ad identity;
   process a payment to the publisher based upon the validation of the payment and contract parameters associated with the publisher;
   electronically send account information to any entity entitled to compensation based on the contract parameters; and
   send an electronic message when a tampering event has been detected.

2. The system for license plate frame advertising verification and validation as recited in claim 1, wherein said system comprises screw, hinge, magnet, frame, or an attachment device.

3. The system for license plate frame advertising verification and validation as recited in claim 1, wherein said system displays text, message, picture, trademark, or symbol.

4. The system for license plate frame advertising verification and validation as recited in claim 1, wherein said frame mount and said license plate are attached to front of said vehicle.

5. The system for license plate frame advertising verification and validation as recited in claim 1, wherein said frame mount and said license plate are attached to back of said vehicle.

6. The system for license plate frame advertising verification and validation as recited in claim 1, wherein said system comprises a user interface.

7. The system for license plate frame advertising verification and validation as recited in claim 1, wherein said system comprises a parameters module.

8. The system for license plate frame advertising verification and validation as recited in claim 1, wherein said system comprises a contract database module.

9. The system for license plate frame advertising verification and validation as recited in claim 1, wherein said system comprises an antenna.

* * * * *